May 3, 1949.  H. O. DAVIDSON  2,469,293
FILTRATION
Filed June 27, 1945
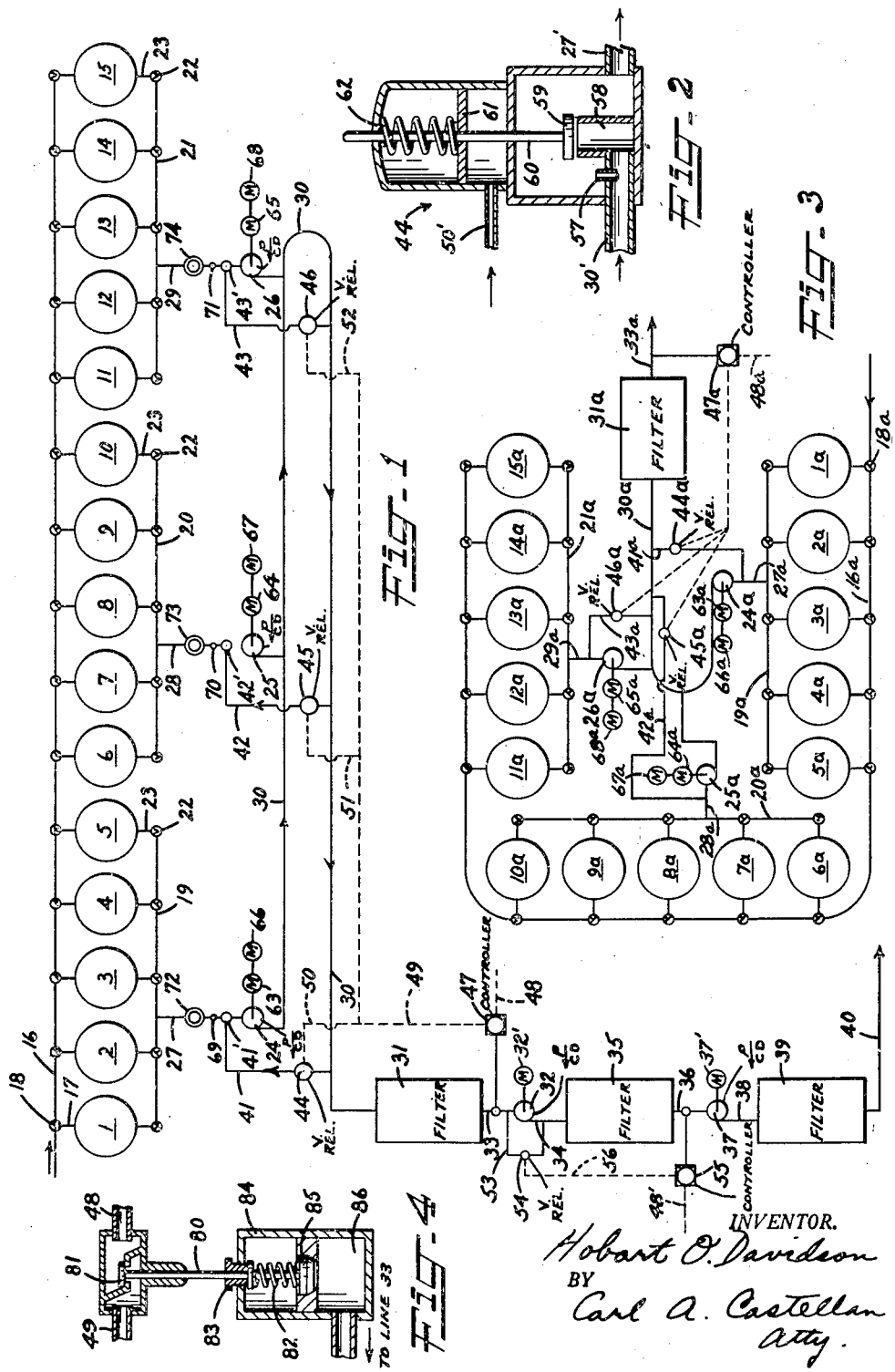
INVENTOR.
Hobart O. Davidson
BY
Carl A. Castellan
Atty.

Patented May 3, 1949

2,469,293

UNITED STATES PATENT OFFICE 2,469,293

FILTRATION

Hobart O. Davidson, Swarthmore, Pa., assignor to American Viscose Corporation, Wilmington, Del., a corporation of Delaware Application June 27, 1945, Serial No. 601,901

2 Claims. (Cl. 210—62)

The present invention relates to an improved apparatus for filtering.

According to the present invention, a filtering system is provided in accordance with which a dispersion of viscose or other material is pumped through a plurality of filters in sequence while continuously by-passing or recirculating a portion of the dispersion about the pump immediately in advance of each filter except the last, controlling the rate of recirculation about each pump except the last in response to the discharge pressure of the filter immediately in advance of the pump, and positively displacing the dispersion through the last filter at a uniform rate, thereby maintaining uniform rate of flow through the series regardless of the extent of clogging of the filters.

While the invention is applicable to the series filtration of any material whenever and wherever it is desired to have a uniform filtration rate, that is one that is not gradually decreased as the clogging of the filters increases, it is hereinafter described in connection with the filtration of viscose dispersions for the production of films, filaments or the like. This application is a continuation in part of my copending application Serial No. 524,583, filed March 1, 1944, now Patent 2,439,619, April 13, 1948. That application describes an improved apparatus for handling viscose or other materials subject to change in properties with passage of time preparatory to delivery to the product-forming stage involving ripening and filtration steps. That apparatus involved delaying filtration to permit the maximum agglomeration of filterable products (which occurs during ripening), after which the filtration is most effective.

The invention is representatively illustrated by the filtration system described in my aforementioned application and shown in the accompanying drawing, of which:

Figure 1 is a diagrammatic view of the piping system;

Figure 2 is a diagrammatic view showing one form of relief valve that may be used in accordance with the invention;

Figure 3 is a diagrammatic view of a modified arrangement; and

Figure 4 is a cross-section showing one form of pressure controller for the relief valves.

In Figure 1 there are shown a plurality of ripening tanks numbered 1 to 15. These tanks are fed from the viscose dissolvers by the header 16 and the branch lines 17 connected to the header by cocks 18, which are three-way except for that connecting the last tank 15, which is two-way. For discharging these tanks, they are associated in groups with separate headers. The number of groups may vary from two to five or more, and the number of tanks in each group may vary from three to six, more or less. As shown, however, there are three groups, each comprising five tanks associated with the headers 19, 20 and 21 respectively. Cocks 22, which are all of three-way type, except for the two-way type used for the tanks connected to the end of the headers, connect the discharge lines 23 from the tank bottoms to their respective headers. Each tank may be provided with a dump valve (not shown) at its bottom, which may be turned to connect or disconnect the tank proper from its discharge line 23.

Separate positive displacement pumps 24, 25 and 26 are connected to the respective headers 19, 20 and 21, through their suction lines 27, 28 and 29, and discharge into a common line 30, which, as shown, doubles back on itself and leads to the filter 31. Another positive displacement pump 32 is connected between the discharge line 33 of filter 31 and the feed line 34 to a second filter 35 which discharges through line 36 connected to the suction side of pump 37, which discharges through line 38 into a third filter 39 from which a discharge line 40 may lead to storage or feed tanks. The filters may be graduated so that each succeeding filter removes finer aggregates, though this is not essential. While three filters are shown in series, two or more than three may be connected in series. All of the pumps except that feeding the last filter operate at higher displacement rates than the last and the excess in each of these faster pumps is by-passed under the control of the discharge pressure of the filter in advance of the respective pump.

By-pass lines 41, 42 and 43 connect the common discharge line at points therein beyond all of the pumps 24, 25 and 26 to the respective pump suction lines 27, 28 and 29 through three-way cocks 41', 42' and 43'. These by-pass lines contain valves 44, 45 and 46, which serve as relief valves as well as by-pass valves. These valves may be hydraulically operated and are controlled by the pressure-responsive controller 47 which is connected to line 33. This controller 47 (an example of which is described hereinafter) may be of any conventional type which opens a valve in an air line 48 (shown dotted) when the pressure in line 33 exceeds a predetermined value to which the controller is set, and thus permits air to flow to the hydraulic relief valves 44, 45 and 46 through the air lines 49, 50, 51 and 52.

A by-pass line 53 connects the pump discharge line 34 with the pump suction line 33, a hydraulically-operable relief and by-pass valve 54 being provided therein. A controller 55 connected to line 36 is responsive to the pressure therein and operates the relief valve 54 by admitting air (such as from an air line 48' which may be connected to the same source of compressed air as line 48) to line 56 when the pressure in line 36 exceeds a predetermined value to which the controller is set.

Figure 2 shows diagrammatically the hydraulically operated relief and by-pass valve 44, which is the same as those used at 45, 46 and 54. The valve has parts 30' and 27' which are connected to lines 30 and 27 respectively. Part 30' opens into part 27' at 57 and 58, the latter opening being provided with a seat against which the valve 59 is normally pressed when closed. The valve stem 60 carries a piston 61 which is normally urged by the spring 62 to close the valve, but which is forced to open the valve when air is admitted through the connection 50' with air line 50. The small opening 57 serves to by-pass a small amount of viscose constantly.

Figure 4 shows one form which the controllers 47 and 55 may take. A rod 80 has fixed upon one of its ends a valve 81 which is normally held closed by the spring 82 operating between an adjustable collar 83 screwed into the casing 84 and a piston 85 secured upon the other end of the rod 80. The valve 81 controls the passage of air (or hydraulic fluid if desired instead) through line 48 into line 49 (or into line 56 in the case of controller 55). This valve 81 is opened when the pressure within chamber 86 connected to line 33 (either directly or through flexible diaphragms in conventional manner) exceeds the predetermined value to which the spring 82 is set by the adjustable collar 83.

Constant speed motors diagrammatically shown at 63, 64 and 65 are provided to drive the pumps 24, 25 and 26, respectively. These motors are preferably adjustable to any speed, so that any predetermined volume of viscose can be delivered thereby, and they are connected to the pumps by means of overdrive clutches, so that small idling motors diagrammatically shown at 66, 67 and 68, can operate the pumps at slow speed when the main driving motors 63, 64 and 65 are not in use. Alternatively each of the pumps 24, 25 and 26 may be connected to a constant speed motor through a reduction gearing transmission by which the pump may be driven alternately at high or low speeds when and as desired.

Constant speed motors 32' and 37' which are preferably adjustable in speed drive the pumps 32 and 37 respectively.

Each discharge header 19, 20 and 21 and its associated line 27, 28 and 29, may be provided with an off-line drain valve or cock 69, 70 and 71 respectively adapted to be manually operated. Sight glasses may be provided at any point in the headers 19, 20 and 21, such as on the far side (with respect to the pump) of each of the intermediate tanks of a given group, so that it can readily be determined when a given tank and section of the header has been drained. There is specifically shown in Figure 1 the sight glasses 72, 73 and 74, just in advance of the cocks 41', 42' and 43'. When a given header has been drained, the main driving motor is stopped, the idling motor is started, and the respective cock is blanked toward the header while permitting flow through the respective by-pass line.

A modification of the arrangement of tanks and pipe lines is shown in Figure 3, in which the important parts corresponding to those shown in Figure 1 are designated by the same reference characters as in Figure 1, with the addition of the postscript a.

In this arrangement, the three groups of ripening tanks $1a$ to $5a$, $6a$ to $10a$, and $11a$ to $15a$, are disposed along the sides of a rectangle with the feeding header $16a$ surrounding them and the several discharge headers $19a$, $20a$ and $21a$, disposed inwardly of the rows of tanks. As in Figure 1, a common line $30a$, is connected to the several headers $19a$, $20a$ and $21a$, by lines $27a$, $28a$ and $29a$, containing the pumps $24a$, $25a$, and $26a$, respectively. The common line $30a$, discharges into the first of a series of filters shown at $31a$. The pumps and filters following $31a$ may be arranged in the same manner as in Figure 1. As in Figure 1, a controller $47a$, receiving air from line $48a$, is connected to the discharge line $33a$ from filter $31a$ and controls relief valves $44a$, $45a$, and $46a$, in the by-pass lines $41a$, $42a$, and $43a$, in similar fashion to that shown in Figure 1. The subsequent pumps and filters following $31a$ may be arranged in the same manner with respect to $31a$ as pumps 32 and 38, and filters 35 and 39 are arranged with respect to filter 31 and Figure 1. Similar by-pass valves and controllers may be used as in Figure 1. The method of operation hereinafter described applies to this embodiment as to that of Figure 1, it being understood that in the description of the operation, the postscript letter "a" may be added to reference characters indicated.

The operation is as follows: Dissolved viscose is delivered in rotation to the ripening tanks, illustratively in the order of their numerical designations, the cock 22 associated with the tank being filled being blanked toward such tank. When ripening has proceeded to such an extent that withdrawal from each of the tanks in sequence is in order, the cocks 22 in the headers 19, 20, and 21, except that associated with the first tank filled, which is tank 1 in the present instance, are blanked toward their tanks with their through-passages communicating with the header on each side of the respective cocks and the cock 22 by tank 1 is turned to connect tank 1 to header 19; cock 41' is turned to connect the header 19, the by-pass line 41, and the pump 24; and the main driving motor 63 operates the pump 24. Cocks 42' and 43' are turned to blank off their respective headers 20 and 21 while connecting the by-pass lines 42 and 43 with the pumps 25 and 26, which are operated at low speed by the idling motors 67 and 68.

Each of the pumps 24, 25 and 26 and 32 is adjusted to deliver when driven by its respective main driving motor somewhat more than pump 37, the excess in each case being discharged around the by-passes associated with the respective pumps.

Pressure controller 55 maintains a constant small positive pressure in the suction side of pump 37 by operating relief valve 54 when the pressure at that point exceeds the predetermined value. Similarly a small constant positive pressure is maintained on the suction side of pump 32 by the controller 47 which operates one or more of the relief valves 44, 45 and 46 when the predetermined pressure is exceeded (see description of operation of this valve in Fig. 4). It will thus be seen that series filtration is obtained with controlled pressure on each filter just sufficient to operate the filter at the desired rate of flow. Pump 37, of course, determines the rate of filtration.

Thus each of the first group of tanks will be emptied in succession, upon the conclusion of which the header 19 is drained, cock 41' is blanked toward the header, leaving the by-pass 41 open to the pump 24. The main motor 63 is stopped and motor 66 is started. The cocks in header 20 are then set, so that tank 6 can be drained through cock 42' which also is open to the by-pass line 42. Motor 64 then operates the pump 25.

After emptying the second group of tanks, withdrawal is performed in similar fashion from the tanks in the third or any additional groups.

While withdrawal is made from one group of tanks, the tanks in other groups may be refilled, cleaned and drained through the off-line valve corresponding to 69, 70, or 71 and repaired, or they may simply be storing viscose for ripening in preparation for subsequent transfer through the filters to feed tanks.

It is to be understood that alternate or relief equipment may be provided at any stage of the system. For example, alternate filters may be provided to permit taking some of them out of the line temporarily for redressing.

Thus the invention provides a system for controlling the pressure on a series of filters to maintain the minimum pressure on the filters that is needed at any time during the filtering cycle to operate at the desired flow, and thus correlating the flow through the several filters to obtain efficient and economical filtration at a substantially uniform rate of flow.

It is to be understood that changes and modifications may be made without departing from the spirit of my invention, as defined in the appended claims.

I claim:

1. Apparatus for filtering a dispersion comprising a plurality of filters connected in series, positive displacement pumping means connected in advance of each filter, the pumping means immediately in advance of the last filter having a uniform discharge rate less than that of the other pumping means, a by-pass connection between the discharge and suction lines of each pumping means except the last, a relief valve in the by-pass connection, and means responsive to the pressure in the discharge line of each filter except the last for opening and closing the relief valve in the by-pass connection in advance of the respective filter.

2. Apparatus for filtering a dispersion comprising a plurality of filters connected in series, each of the filters having a greater fineness than that of the preceding filter, positive displacement pumping means connected in advance of each filter, the pumping means immediately in advance of the last filter having a uniform discharge rate less than that of the other pumping means, a by-pass connection between the discharge and suction lines of each pumping means except the last, a relief valve in the by-pass connection, and means responsive to the pressure in the discharge line of each filter except the last for opening and closing the relief valve in the by-pass connection in advance of the respective filter.

HOBART O. DAVIDSON.

REFERENCES CITED

The following references are of record in the file of this patent:

UNITED STATES PATENTS

| Number | Name | Date |
| --- | --- | --- |
| 1,450,560 | Morton | Apr. 3, 1923 |
| 1,853,263 | Dudley | Apr. 12, 1932 |
| 2,025,570 | Clark | Dec. 24, 1935 |
| 2,214,671 | Hagan | Sept. 10, 1940 |